United States Patent
Jaeckel et al.

(10) Patent No.: US 7,343,832 B2
(45) Date of Patent: Mar. 18, 2008

(54) TORSIONAL VIBRATION DAMPER

(75) Inventors: Johann Jaeckel, Buehlertal (DE); Hartmut Mende, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 665 days.

(21) Appl. No.: 10/776,735

(22) Filed: Feb. 11, 2004

(65) Prior Publication Data

US 2004/0182196 A1    Sep. 23, 2004

(30) Foreign Application Priority Data

Feb. 14, 2003   (DE)   ................. 103 06 163

(51) Int. Cl.
  *F16F 15/12*   (2006.01)
(52) U.S. Cl. .................................. 74/573.12
(58) Field of Classification Search ............... 74/572,
    74/572.2, 573.12, 574, 574.3, 574.4; 123/192.1;
    464/51, 61, 61.1, 68, 68.8
    See application file for complete search history.

(56) References Cited

U.S. PATENT DOCUMENTS

| 4,904,225 | A | * | 2/1990 | Worner et al. ............. 464/63.1 |
| 5,095,771 | A | * | 3/1992 | Kuhne ....................... 464/68.3 |
| 5,150,777 | A | | 9/1992 | Friedmann ............... 192/70.17 |
| 5,289,737 | A | * | 3/1994 | Kuhne ...................... 464/68.92 |
| 5,310,267 | A | | 5/1994 | Jackel ......................... 384/462 |
| 5,622,245 | A | | 4/1997 | Reik et al. .................. 192/55.1 |
| 5,681,221 | A | | 10/1997 | Albers et al. ................. 464/67 |
| 6,113,496 | A | * | 9/2000 | Oyama et al. ............. 464/68.8 |
| 6,119,840 | A | | 9/2000 | Dettmar .................... 192/70.17 |
| 6,131,487 | A | * | 10/2000 | Jackel et al. ............... 464/64.1 |
| 6,223,625 | B1 | * | 5/2001 | Ara et al. ................. 464/68.41 |
| 6,286,390 | B1 | * | 9/2001 | Rohs et al. .............. 464/68.92 |
| 6,364,775 | B1 | * | 4/2002 | Rohs et al. .............. 464/68.92 |
| 6,575,838 | B2 | * | 6/2003 | Jackel et al. ............. 464/68.92 |
| 6,712,706 | B2 | * | 3/2004 | Jackel et al. ............. 464/68.41 |
| 2002/0128074 | A1 | * | 9/2002 | Jackel et al. .................. 464/68 |
| 2002/0147051 | A1 | | 10/2002 | Jackel et al. .................. 464/68 |
| 2005/0070362 | A1 | * | 3/2005 | Mende et al. ................. 464/68 |

FOREIGN PATENT DOCUMENTS

| DE | 4117582 | 12/1991 |
| DE | 4214655 | 12/1992 |
| DE | 4414584 | 11/1994 |
| DE | 4420927 | 12/1994 |
| DE | 19522718 | 1/1996 |
| DE | 19749678 | 12/1998 |
| DE | 19810550 | 3/1999 |
| DE | 10209838 | 9/2002 |
| DE | 10241879 | 4/2003 |
| GB | 2277791 | 11/1994 |
| GB | 2346128 | 8/2000 |

* cited by examiner

*Primary Examiner*—Vicky A. Johnson
(74) *Attorney, Agent, or Firm*—Davidson, Davidson & Kappel (57) ABSTRACT

A torsional vibration damper is described having at least two parts rotatable around an axis of rotation, which are pivotable toward one another against the effect of at least one energy accumulator, the parts pivotable toward one another having regions using which the energy accumulator, which acts around the circumference of the torsional vibration damper, is compressible, the energy accumulator having at least one spring held in a carrier.

16 Claims, 5 Drawing Sheets

TORSIONAL VIBRATION DAMPER

This claims the benefit of German Patent Application No. 103 06 163.0, filed Feb. 14, 2003 and hereby incorporated by reference herein.

BACKGROUND INFORMATION

The present invention relates to a torsional vibration damper, for motor vehicles in particular, having at least two parts, rotatable around a rotational axis, which are pivotable toward one another against the effect of at least one energy accumulator, the parts which are pivotable toward one another having regions using which the energy accumulator, which acts around the circumference of the torsional vibration damper, is compressible, this energy accumulator being formed by at least one spring, such as a helical compression spring.

Torsional vibration dampers of this type in the form of dual-mass flywheels have become known, for example, from German Patent Application Nos. 41 17 582 A1, 42 14 655 A1, 44 14 584 A1, 44 20 927A1, and 195 22 718 A1, which relate respectively to U.S. Pat. Nos. 5,150,777 and 5,310,267, British Patent Application No. 2 277 791, and U.S. Pat. Nos. 5,622,245 and 5,681,221, all of which are hereby incorporated by reference herein.

BRIEF SUMMARY OF THE INVENTION

The present invention is based on an object of optimizing torsional vibration dampers of the above-mentioned type in regard to their damping properties. An additional or alternative objective according to the present invention is that the torsional vibration damper may be manufactured and installed in an especially simple way. In particular, it is desired that even at relatively high rotational speeds of the torsional vibration damper, its energy accumulators, which may be formed by helical compression springs in particular, may fulfill their assigned function optimally.

The present invention provides a torsional vibration damper of the type initially described in that the at least one spring is received in a carrier part, which has at least a limited capability to pivot in relation to both parts which are pivotable toward one another, the end regions of the spring being supported in the carrier in such a way and the carrier being implemented in such a way that the intermediate region of the spring provided between these end regions remains contactless—at least up to a limiting rotational speed—in relation to regions of at least one component which overlap these spring intermediate regions radially on the outside. Through a design of this type, it is ensured that the spring received in the carrier, which may preferably be formed by a helical compression spring, may operate and/or be compressed practically frictionlessly. Through a design of this type, it may be ensured that the spring rate or elasticity and/or the spring travel of the spring is practically uninfluenced by the centrifugal force acting thereon. Through a design of the torsional vibration damper of this type, it may be ensured that at least up to a specific limiting rotational speed there is a sufficiently low pivot elasticity and/or a sufficiently small pivot resistance between the damper input part and the damper output part over a specific pivot angle that the occurrence of resonance effects and/or interfering noises is prevented or at least reduced to an acceptable level. In this way, the driving comfort of a motor vehicle may be significantly improved.

In an especially advantageous way, the carrier which receives at least one spring may be positioned inside the torsional vibration damper in such a way that this spring is only active during motor braking. The at least one spring received in a carrier part therefore does not have to be designed for the idle range of an internal combustion engine which works together with a torsional vibration damper designed according to the present invention, but rather is designed for the load range of the torsional vibration damper in particular.

Through the positioning according to the present invention of at least one spring inside a carrier which is pivotable and/or movable in relation to the input part and output part of the torsional vibration damper, for many applications, the vibration isolation between the internal combustion engine and drive train and/or transmission may be significantly improved. Problems in regard to the vibration isolation may often be attributed to the damping effect of the rotationally elastic damper provided between the damper input part and damper output part being dynamically influenced, because friction, which acts in parallel to the spring effect of the energy accumulator and increases with increasing rotational speed, is generated due to the centrifugal forces acting on the energy accumulator of the damper. Friction of this type occurs in particular if the energy accumulators provided between the damper input part and damper output part include power accumulators which are formed by helical compression springs having a large length/coil diameter ratio. Specifically, with increasing rotational speed, the above-mentioned friction damping may increase enough in power accumulators of this type that the springs of the power accumulators may at least no longer completely relax. Therefore, this means that power accumulators of this type in rotating torsional vibration dampers may not assume their completely relaxed length, but remain at least partially tensioned. This increase in the torsional stiffness between the input part and output part of the torsional vibration damper caused by the centrifugal force and/or the power accumulators may lead to the degree of isolation of the torsional vibration damper no longer being sufficient for many driving conditions, so that resonance magnification factors may occur. These may be present at different rotational speeds and/or in different rotational speed ranges, resonance occurrences of this type arising in most cases in a rotational speed range from 1200 to 3000 rpm. Furthermore, the use of long power accumulators to form energy accumulators is made possible through the design of a torsional vibration damper according to the present invention, in that at least one of the ends of an elongated power accumulator having a large spring travel is assigned to at least one spring received in a carrier according to the present invention. The energy accumulator thus formed therefore includes at least one spring received in a carrier and a power accumulator having a large spring travel. A power accumulator of this type having a large spring travel or displacement may be formed by one single elongated helical spring or even by multiple shorter helical springs positioned one behind another. The shorter helical springs may support one another directly or even with support shoes interposed between them. Reference is made to the description of the figures in regard to further possible applications, even without elongated power accumulators having a large spring travel.

The carrier described above, which receives at least one spring, may also be referred to as the receiving component or as the slide in regard to this spring.

A carrier part according to the present invention may also be designed in such a way that it receives at least two compression springs positioned one behind another in series, the end regions of the power accumulator formed by the springs connected in series, viewed around the circumference of the torsional vibration damper, being supported at least around the circumference by the carrier part and the end regions of neighboring springs facing toward one another being supported via at least one support element in such a way that the spring intermediate region provided between the end regions of the individual springs is held at least essentially frictionlessly in the carrier at least up to a limiting rotational speed. Through a design of this type, the spring travel of the power accumulator received in a carrier part may be enlarged.

It may be especially expedient if at least one spring received in a carrier is operatively connected in series to at least one further spring positioned outside the carrier, which may be impinged and/or compressed using support regions provided on the carrier. This further spring is supportable directly on the carrier in this case. It may be expedient if the end of the further spring facing toward the carrier is connected to the carrier part, so that no torsional play may arise between the carrier and the further spring. The further spring may be formed by at least one elongated helical compression spring in this case.

As already explained in connection with the related art cited at the beginning, the torsional vibration damper designed according to the present invention may be a component of a dual-mass flywheel and/or form a dual-mass flywheel of this type, one of the two flywheel masses being able to have an annular receiver for the carrier which is at least limitedly pivotable inside this receiver. The annular receiver may advantageously be delimited in this case by at least one ring-like wall region which overlaps the at least one carrier radially on the outside both in the axial direction and around the circumference. For an embodiment of this type, it may be expedient if the torsional vibration damper is constructed in such a way that the carrier may be radially supported on the ring-like wall region and is movable along the wall region, at least under the effect of centrifugal force. In a design of this type, the carrier may slide along the wall region like a slide. In order to reduce the friction present in this case, at least the boundary surface of the wall region which works together with the carrier and/or the carrier may be made of a material having a low coefficient of friction or may be coated with a material having a low coefficient of friction. The friction is advantageously reduced by providing a lubricant, such as grease, in the annular receiver.

Furthermore, it may be advantageous for the construction and the function of the torsional vibration damper if the at least one further spring which is connected in series to at least one carrier is supportable radially toward the outside via at least one support element, which is positioned between this further spring and the ring-like wall region overlapping it axially and is moved along this wall region when the further spring is compressed. In regard to the arrangement and the design of support elements of this type, reference is made to German Patent Application No. 102 09 838 A1, related to U.S. patent Publication Ser. No. 2002/147051, hereby incorporated by reference herein, and the related art described therein, for example, so that a more detailed description of support elements of this type is not necessary in the present invention.

In a similar way as in the above-mentioned related art, support regions are also present in the annular receiver of a torsional vibration damper constructed according to the present invention, on which the carrier is supportable at least in a relative pivot direction between the two flywheel masses. The second flywheel mass also has impingement regions which project into the annular receiver and using which the at least one spring received in the carrier may be impinged. The impingement regions of the second flywheel mass may be formed by a flange in this case, whose corresponding radial extensions project into the annular receiver.

It may be expedient for the construction and the function of a carrier received according to the present invention inside the torsional vibration damper if this carrier has free regions and/or free spaces extending around the circumference into which impingement regions for the at least one spring received in the carrier are able to dip during a rotation of the two parts, such as flywheel masses.

Furthermore, it may be advantageous for the construction and the function of the torsional vibration damper if there are multiple carriers which are distributed uniformly, viewed around the circumference of the torsional vibration damper. In this way, out-of-balance problems may be avoided. It may also be expedient if at least two carriers are connected to one another and are supported against centrifugal force by at least one ring-like component. With a design of this type, at least up to a relatively high rotational speed of the driving internal combustion engine, the carrier may be prevented from coming to rest on a wall which axially overlaps it under the effect of centrifugal force. Excessive frictional damping may thus be avoided.

BRIEF DESCRIPTION OF THE DRAWINGS

Further advantages, constructive features, and functional properties of torsional vibration dampers implemented according to the present invention result from the following description, in which different exemplary embodiments are described with reference to the drawing.

FIGS. 9 and 10 show embodiment variations of carrier parts to receive springs.

DETAILED DESCRIPTION

Figures 1, 2, 2A:
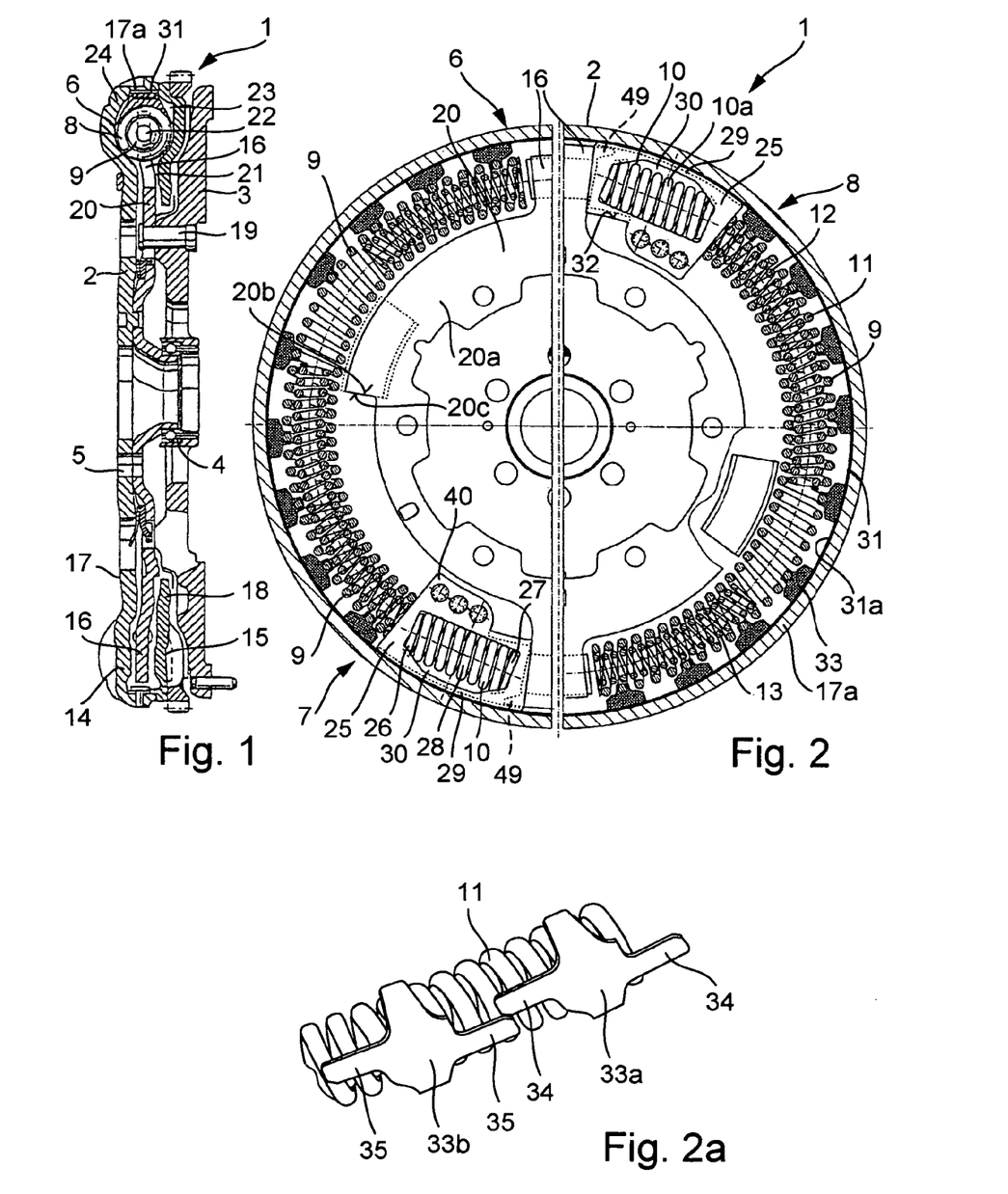
FIG. 1 shows a section through a damping device in which the achievements of the object according to the present invention may be used.
FIG. 2 shows a system of different power accumulators and/or springs which may be used in a damping device as shown in FIG. 1.
FIG. 2*a* shows a possibility for designing and arranging slide shoes to support an elongated power accumulator and/or a helical spring.

The torsional vibration damper shown in FIGS. 1 and 2 in section forms a split flywheel 1, which has a first or primary flywheel mass 2, attachable to a drive shaft of an internal combustion engine, and a second or secondary flywheel mass 3. A friction clutch may be attachable to second flywheel mass 3 with a clutch disk interposed, via which an input shaft of a transmission may be coupled and decoupled. Flywheel masses 2 and 3 are mounted pivotably in relation to one another via a bearing 4, which, in the exemplary embodiment shown, is positioned radially inside holes 5 for guiding through attachment screws for installing first flywheel mass 2 on the output shaft of an internal combustion engine. A damping device 6 is active between both flywheel masses 2 and 3. Damping device 6 shown in FIG. 2 has two energy accumulators 7, 8, each of which is formed by two power accumulators 9 and 10 connected in series.

In the exemplary embodiment shown, power accumulator 9 includes multiple helical compression springs 11, 12, 13. Depending on the application, however, only the spring having a larger coil diameter 11 or even only two springs 11, 12 or 11, 13 may be expedient. In its overall design, elongated power accumulators 9 may also be used, which include multiple shorter helical springs positioned one behind another. These helical springs may either be supported directly on one another or may be supported on one another via interposed, preferably wedge-shaped separators. Power accumulators of this type have become known, for example, from German Patent Application No. 197 49 678 A1, related to U.S. Pat. No. 6,119,840, and German Patent No. 198 10 550 C2, related to British Patent Application No. 2 346 128, all four of these patent documents being incorporated by reference herein. The individual springs positioned one behind another, which form the power accumulators, may also include multiple nested helical springs in this case.

As already noted, power accumulators 9 shown in FIG. 2 each include three helical compression springs 11, 12, 13, helical compression springs 12, 13 being at least partially received in the elongated space formed by the coils of outer helical compression spring 11. Helical compression springs 12, 13 are nested with helical compression spring 11 when viewed over their lengthwise extension. Through a design of power accumulators 9 of this type, an at least two-stage spring characteristic curve may be achieved. If at least two inner helical compression springs 12, 13 having different spring stiffnesses are used, an at least three-stage spring characteristic curve may also be achieved. As may also be seen from FIG. 2, there is spacing around the circumference between the end regions facing toward one another of inner helical compression springs 12, 13 of power accumulators 9, at least in the relaxed state. If necessary, this spacing may be at least partially filled up by a further inner spring.

If inner helical compression springs 12, 13 having different spring stiffnesses are used, it is expedient if the spring having a lower stiffness is provided at the end and/or at the end region of power accumulators 9 which is loaded during acceleration of the motor vehicle equipped with a corresponding torsional vibration damper. The softer, inner helical compression spring is therefore to be provided in the end region of a power accumulator 9 via which the torque generated during acceleration of the drive motor is conducted into corresponding power accumulator 9. During motor braking, the torque is conducted into corresponding power accumulator 9 via its other end. Motor braking of the motor vehicle occurs when the vehicle is decelerated via the braking effect of the engine, i.e., there is a torque flow from the drive wheels to the engine.

Both flywheel masses 2 and 3 have impingement regions 14, 15, and/or 16 for energy accumulators 7, 8. These impingement regions 14, 15, 16 may also be referred to as support regions. In the exemplary embodiment shown, impingement regions 14, 15 are formed by embossments introduced into sheet metal parts 17, 18 which form first flywheel mass 2. Axial impingement regions 16 provided between impingement regions 14, 15 are formed by at least one flange-like impingement part 20 connected to secondary flywheel mass 3 via rivets 19, for example. This component 20 is used as a torque transmission element between energy accumulators 7, 8 and flywheel mass 3. Impingement regions 16 are formed by radial arms and/or extensions 16 provided on the outer circumference of flange-like impingement part 20. Component 17, designed in the exemplary embodiment shown as a sheet metal component, is used to attach first flywheel mass 2 and/or entire split flywheel 1 to the output shaft of an internal combustion engine. Component 17 may, however, also be manufactured as a cast component. Component 17 is connected radially on the outside to component 18, which also forms a radial wall. Both components 17 and 18 form a ring-like space 21, which forms an external radial torus-like region 22 here. Region 22 may have an essentially annular, oval, or rectangular cross-section in this case. Annular space 21 and/or torus-like region 22 may be at least partially filled with a viscous medium, such as grease. Viewed around the circumference, components 17, 18 form receivers, which are implemented here as indentations 23, 24, between protuberances and/or impingement regions 14, 15. Energy accumulators 7, 8 are received in these receivers.

Power accumulator 10, which is connected in series to a power accumulator 9, is formed in the exemplary embodiment shown by a cylindrical helical compression spring. However, a power accumulator 10 of this type may also be formed by multiple helical compression springs which are nested, similarly to the way described in connection with power accumulators 9. Helical compression spring 10a forming power accumulator 10 here is received in a carrier 25, which may also be referred to as a slide or cassette. Power accumulator 10 and/or helical compression spring 10a is supported in carrier 25 via its end regions and/or its end coils 26, 27 in such a way that the coils 28 present between these end coils 26, 27 are contactless in relation to the regions of the adjoining components which overlap them radially on the outside. It may be inferred from FIG. 2 that intermediate coils 28 have a play and/or a clearance 30 in relation to regions 29 of a carrier 25 which overlap them radially on the outside. The bending stiffness of power accumulator 10 and/or helical compression spring 10a is dimensioned in this case in such a way that no contact may occur between coils 28 and carrier regions 29 over a relatively high rotational speed range of the engine driving torsional vibration damper 1. It is expedient in this case if no contact of this type may occur at least up to a rotational speed of 3000 rpm. The higher this rotational speed is, the better it is for the filtering function of the torsional vibration damper.

The construction of a carrier 25 will be described in greater detail in connection with FIGS. 3, 4, 5 and 6.

In the exemplary embodiment shown in FIGS. 1 and 2, carriers 25 are angularly pivotable and/or movable both in relation to primary mass 2 and in relation to flange-like component 20. Carrier parts 25 support themselves under the effect of centrifugal force on these axially overlapping regions 17a of component 17 and/or 18. This support may occur in this case, as shown, with a wear protector 31 interposed, which is formed here by at least one hardened sheet metal spacer and/or sheet metal insert. Carriers 25 may be moved along this wear protector 31, the carriers having and/or building up a displacement resistance as a function of the rotational speed because of the effect of centrifugal force. Carrier parts 25 delimit a free space, which will be described in even greater detail in connection with FIG. 3, allowing engagement and/or dipping of extensions 16 into carrier 25 in region 32 of carrier 25, through which the compression and/or impingement of power accumulator 10 may occur. Carriers 25 are supported around the circumference on power accumulators 9.

At least when device 1 is rotating, power accumulators 9, which are implemented as elongated around the circumference, are also supported on outer radial regions 17a. The support occurs in this case, as may be seen from FIG. 2, with support elements 33 interposed, which may be implemented as rolling or friction shoes. Reference is made to German Patent Application No. 102 41 879, hereby incorporated by reference herein, in regard to the possible design of friction shoes and/or rolling shoes 33 of this type and their function. For many applications, direct support of power accumulator 9 and/or helical compression spring 11 on regions 17a and/or on wear protector 31 may also be advantageous.

Figures 7, 8, 9, 10:
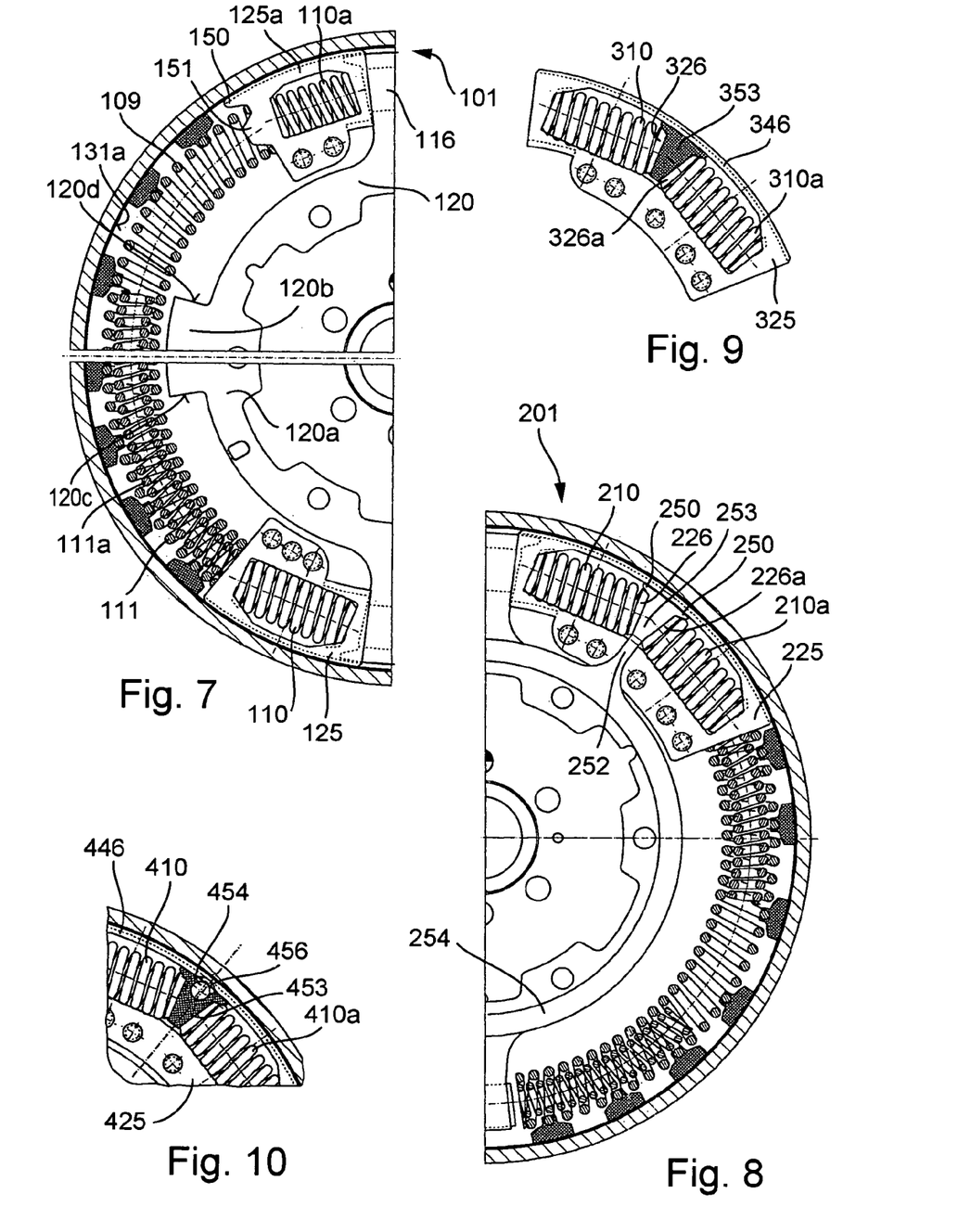

Through the accommodation according to the present invention of a power accumulator 10 in a carrier 25 which has the ability to pivot freely in relation to both parts 2, 3 carrying impingement regions 14, 15, and 16, it may be ensured that even at relatively high rotational speeds of the drive engine, at least the coils of helical compression spring 10a forming a power accumulator 10 may operate freely. This ensures that, even at relatively high rotational speeds of torsional vibration damper 1, free compression and relaxation of force accumulator 10 is made possible. Depending on the application, it may be expedient if a carrier 25 of this type is positioned in such a way that it ensures improvement of isolation during traction mode or acceleration by minimizing the friction occurring during relative pivoting of both flywheel masses 3, 4. For many applications, however, a carrier 25 may also be positioned inside the torsional vibration damper in such a way that it ensures better isolation during deceleration or motor braking. There may also be applications in which at least one carrier 25 having an appropriately received and implemented power accumulator 10 is expedient for both isolation during deceleration or motor braking and isolation during acceleration or traction mode. The latter design is shown in FIG. 7 and will be explained briefly in connection therewith.

The energy accumulator formed by power accumulator 9 supports itself under the effect of centrifugal force on wall 17a axially overlapping it. In this way, the frictional engagement between individual friction shoes 33 and support surface 31a formed by the inner surface of wear protection strip 31 becomes greater with increasing rotational speed. This frictional engagement is even greater in embodiments in which the coils of helical compression spring 11 are supported directly on surface 31a. The above-mentioned frictional engagement leads to the spring rate and/or return force of power accumulator 9 no longer being sufficient to overcome this frictional engagement if a specific rotational speed is exceeded. As a result of this, the effective length of a power accumulator 9 becomes shorter and shorter with increasing rotational speed and after a corresponding impingement of this power accumulator 9. Power accumulator 9 and/or the helical compression springs which form it therefore remain tensioned because of the frictional engagement cited and become harder in regard to their damping effect and/or spring stiffness, since the resulting pivot resistance generated by power accumulator 9 is significantly influenced by the frictional engagement it generates itself. This increase in the pivot resistance between both flywheel elements 3 and 4 causes interfering noises to be generated, at least at many rotational speeds and/or in many rotational speed ranges of the internal combustion engine, in particular during the transition from motor braking to traction mode and/or during the transition from traction mode to motor braking. Through the practically frictionless receiving of power accumulator 10 in a carrier 25 according to the present invention, it may be ensured that at least up to a relatively high rotational speed of the internal combustion engine, such as 3000 rpm, a sufficiently small pivot stiffness and/or pivot elasticity always exists between both flywheel elements 3 and 4, so that the noises cited may at least be reduced to an acceptable level. Noises of this type may also be attributed to resonance occurrences. Furthermore, noises may be generated if impingement regions 16 strike suddenly on the end regions of energy accumulators 7 and 8 in the event of a sudden transition from motor braking to traction mode and vice versa. Because, however, elasticity and/or elastic yielding is always ensured by the use of a slide 25 having at least one helical spring received practically without friction therein, a harder impact may be avoided since the energy may be collected over a specific compression path of helical compression spring 10a.

Figures 3, 4:
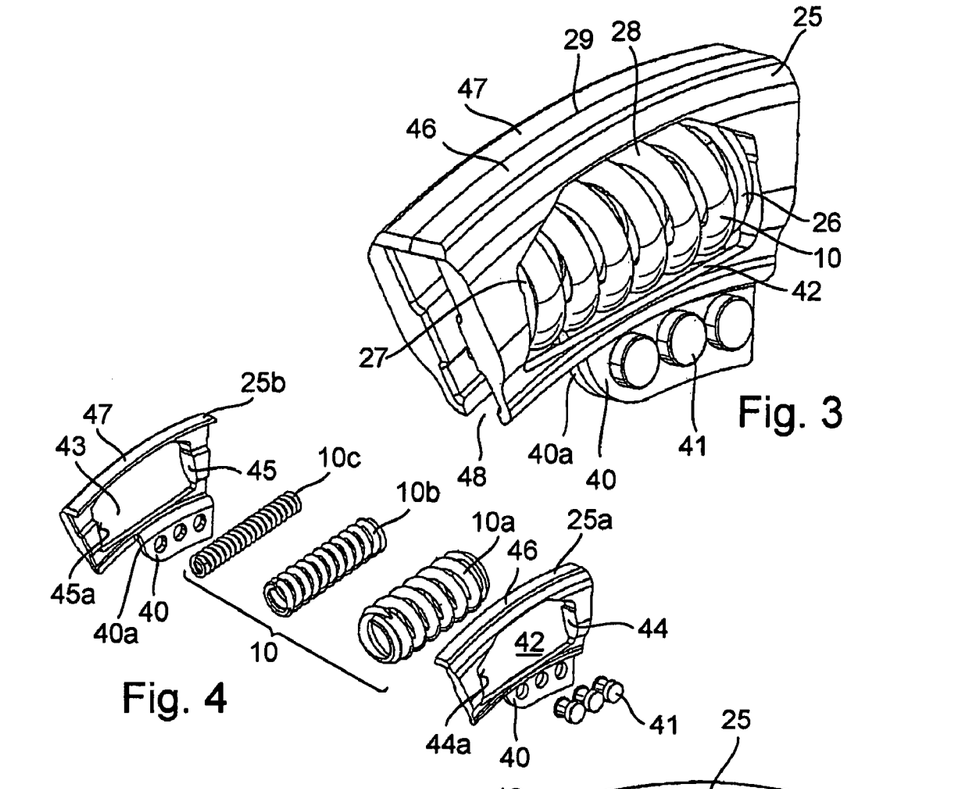
FIGS. 3 to 6 show various details of a carrier receiving a power accumulator, which may be used in a design as shown in FIGS. 1 and 2, FIGS. 7 and 8 show further possible designs in which achievements of the object according to the present invention are used.
Figures 5, 6:
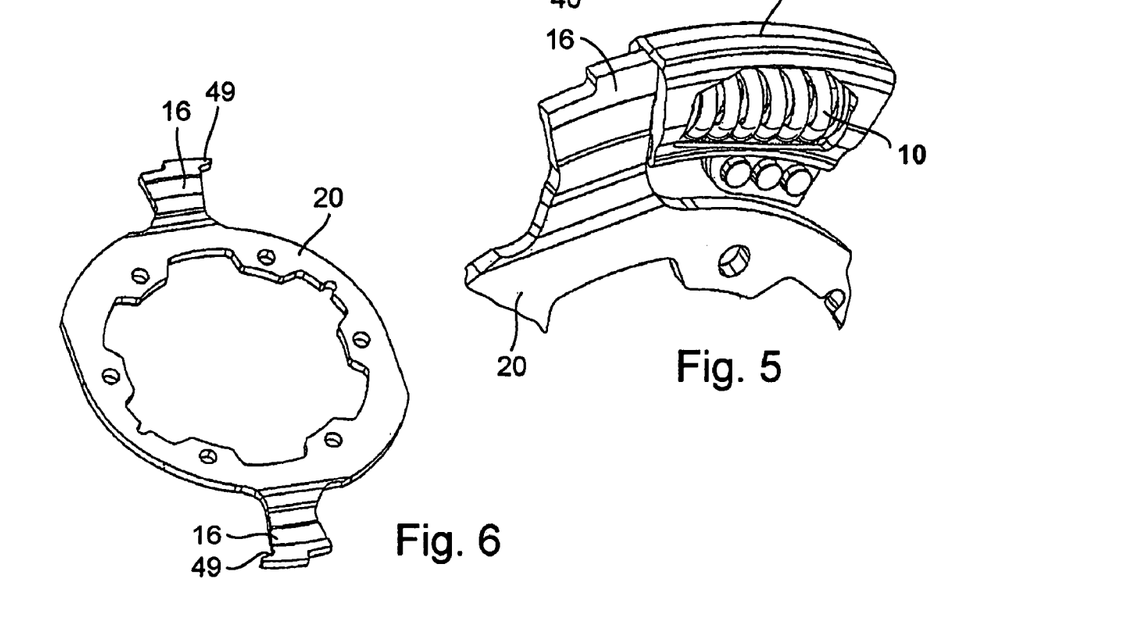

As may be inferred from FIGS. 3 through 5, carrier 25 forms a cassette-like receiving component for power accumulator 10, which, as may be inferred from FIG. 4, includes three nested and/or telescoping helical compression springs 10a, 10b, and 10c in the exemplary embodiment shown. In the exemplary embodiment shown, these three helical compression springs have identical lengths. However, helical compression springs of different lengths may also be used, so that at least one two-stage power accumulator characteristic curve may be produced. Cassette-like receiving component 25 includes two segmented and/or shell-like components 25a, 25b in the exemplary embodiment shown, which have a tab-like protuberance 40 radially on the inside, in the region of which rivets 41 are placed, which connect both segmented components 25a, 25b permanently to one another. In this way, a cage-like and/or cassette-like receiving part for power accumulator 10 is formed.

As may be seen from FIG. 4, for example, windows 42, 43 are provided in components 25a, 25b, which form support regions 44, 45, 44a, 45a when viewed around the circumference of the torsional vibration damper, between which the corresponding power accumulator 10 is positioned around the circumference. For this purpose, it may be expedient if at least outermost spring 10a having the largest coil diameter presses against these support regions 44, 45, 44a, 45a. It may be expedient in this case if at least this outer helical compression spring 10a presses against these support regions with at least a slight pre-tension.

Windows and/or receivers 42, 43 for a power accumulator 10 provided in receiving component 25 and/or in components 25a, 25b are implemented in such a way that it is ensured that only ends 26, 27 of power accumulator 10 and/or of outer helical compression spring 10a are supported in the radial direction by receiving component 25.

Outer radial regions 46, 47, present between support regions 44, 44a and 45, 45a, of receiving component 25 and/or components 25a, 25b which form it are designed in such a way that a free space exists between them and power accumulator 10, which ensures that as power accumulator 10 is compressed and relaxed, no frictional support occurs between power accumulator 10 and the diametrically opposite surfaces of regions 46, 47, at least up to a specific minimum rotational speed. If this minimum rotational speed is exceeded, a corresponding contact may nonetheless occur because of the centrifugal force acting on power accumulator 10 and the sag of power accumulator 10 thus produced, which then, however, produces an interfering effect on the function of torsional vibration damper 1. It is expedient if this minimum rotational speed is at least 2500 rpm, or preferably above this.

In order to avoid the above-mentioned frictional contact between an energy accumulator 10 and regions 46, 47 overlapping it, windows and/or receivers 42, 43 are expanded at least radially outward, starting from impingement regions 44, 45, 44a, 45a, as may be inferred from the figures. If the regions of components 25a, 25b forming a receiving component 25 present inside an energy accumulator 10 are able to ensure sufficient stiffness and/or strength of receiving component 25, outer radial regions 46, 47 may also be implemented in such a way that windows 42, 43 are at least partially open radially to the outside. Therefore, this means that regions 46, 47 overlapping an energy accumulator 10 radially on the outside do not extend over the entire length of a power accumulator 10.

As may be seen from FIG. 3 in particular, receiving component and/or carrier part 25 is designed in such a way that it forms a free space 48 on at least one end of assigned power accumulator 10, into which, as may be seen from FIG. 2 and FIG. 5 in particular, impingement regions 16 may dip, which are formed here by arms 16 of flange 20. In this way, power accumulator 10 may be compressed and relaxed inside receiving component 25.

In order to prevent a power accumulator 10 from being able to slide radially outward in relation to impingement regions 16 during its compression and relaxation, impingement regions 16 have a corresponding design which ensures that the power accumulator end supported on impingement regions 16 is retained radially. In the exemplary embodiment shown, a lug-shaped protuberance 49 is provided around the circumference, as may be inferred from FIG. 2 and, in particular, FIG. 6. This protuberance 49 radially overlaps the corresponding end of power accumulator 10 on the outside and retains it against the centrifugal force acting on power accumulator 10. However, embodiments are also possible in which a correspondingly designed lug engages in the inner free space of a power accumulator 10. This is possible in particular if only one helical compression spring 10a is used to form a power accumulator 10 or even if additional helical compression springs 10b, 10c possibly received in a helical compression spring 10a are shorter than helical compression spring 10a, so that a correspondingly designed retaining lug may dip into the free space which is formed inside spring 10a by the length difference.

During a relative pivot between both flywheel elements 2 and 3 in the deceleration or acceleration directions, energy accumulators 7, 8 between impingement regions 14, 15, 16, which work together therewith, are compressed, at least after a specific pivot angle, out of the rest position and/or starting position of torsional vibration damper 1 shown in FIG. 2. In the exemplary embodiment shown, energy accumulators 7, 8 are impinged and/or supported at one of their ends by arm 16 in the event of traction mode, the other of their ends being loaded by impingement regions 14, 15. Traction mode means that the engine outputs a drive torque for the motor vehicle, i.e., the engine drives the motor vehicle. In the embodiment shown in FIGS. 1 and 2, during traction mode, power accumulator 10 is supported on impingement regions 16 of flange 20 and power accumulator 9, which is supported on carrier component 25, is impinged by impingement regions 14, 15 of primary flywheel mass 2 and is therefore compressed between carrier component 25 and these impingement regions 14, 15.

The construction of torsional vibration damper 1 according to the present invention has the advantage that for large vibration angles between both flywheel elements 2, 3, receiving components 25 for power accumulators 10, which may also be referred to as spring slides, operate in series with main power accumulator 9 with relatively high friction, through which good starting and/or load change behavior may be achieved. At high rotational speeds of torsional vibration damper 1 and/or at large torques to be transmitted and small vibration angles, only the power accumulators received in receiving parts 25 may be compressed and relaxed, practically frictionlessly. In this way, good vibration isolation between the engine and transmission may be achieved. Vibrations of this type having small vibration angles are predominantly high frequency.

Depending on the application, it may be expedient to keep the mass of the receiving components as small as possible, so that receiving components 25 may then be manufactured, for example, from plastic or a light metal, such as aluminum, or from a combination of metal and plastic. For many applications, however, it may also be expedient if receiving components 25 have a certain mass, since in this way a higher dynamic friction is produced, in particular at higher rotational speeds and higher vibration angles.

Torsional vibration damping device 101, only half of which is shown in FIG. 7, differs from those shown in FIGS. 1 and 2 essentially in that, viewed around the circumference, a power accumulator receiving component 125, 125a is provided on each side of elongated power accumulator 109, which has a large spring displacement or travel. Receiving component 125 carries a power accumulator 110a in a similar way to that described in connection with receiving component 25. Receiving component 125a may also be referred to as a power accumulator slide and/or spring slide, since it may slide along cylindrical and/or annular surface 131a and, as already noted, carries a power accumulator which is formed by a helical compression spring 110a. Through the use of receiving components 125a, deceleration-side isolation problems may also be solved. Receiving components 125, 125a are preferably positioned diametrically opposing in pairs inside torsional vibration damper 101, in order to avoid out-of-balance problems. If a larger number of receiving components 125 and/or 125a are used, they are preferably positioned distributed uniformly, viewed around the circumference and in relation to the axis of rotation of torsional vibration damper 101.

In order to ensure that receiving components 125 and/or 125a assigned to one another maintain a defined angular position in relation to one another (in order to avoid out-of-balance problems), it may be expedient if receiving components 125 and, if present, receiving components 125a are connected to one another so that they rotate together via a component which may be implemented as an annular part, for example. A component of this type may have a certain radial elasticity, so that corresponding receiving components 125 and/or 125a may be supported on surface 131a under the effect of centrifugal force. The component which connects corresponding receiving components 125 and/or 125a to one another so that they rotate together may be connected to receiving components 125 and/or 125a using rivet connections 41 (FIGS. 3 and 4), for example, which are described in connection with FIGS. 1 through 6.

As may be seen from FIG. 7, receiving component 125a is provided on its side facing toward the assigned end of power accumulator 109 with lugs 150, 151 extending around the circumference. These lugs 150, 151 are implemented as wedge-shaped when viewed around the circumference, so that they form insertion contours in relation to the corresponding end of power accumulator 109, which ensure that when power accumulator 109 is impinged by receiving component 125a, the corresponding end of power accumulator 109 and/or helical compression spring 111 which forms it is positioned in the radial direction. A further helical compression spring 111a, which only extends here over a part of the elongated extension of outer helical compression spring 111, is received inside helical compression spring 111.

To delimit the relative pivot between both flywheel elements 2, 3, for example, as shown in FIGS. 1 and 2, at least one of the helical compression springs which form power accumulators 9, 10, 109, 110, may form a block. This means that the coils of such a helical compression spring come to rest on one another in at least some positions and therefore prevent further compression of the corresponding helical compression spring. However, it may also be expedient if at least some of the power accumulators, such as power accumulators 9, 109, which are elongated around the circumference and have a large spring travel are protected from forming a block. For this purpose, corresponding limiting stops may be provided between the primary and secondary flywheel masses. Stops of this type may, for example, be formed through a corresponding design of annular body region 20a of flange 20, as may be seen from the left side of FIG. 2. As may be seen from the left side of FIG. 2, flange body 20, viewed around the circumference, forms a radial step 20b which delimits a stop surface 20c. In the event of a relative pivot between both flywheel elements 2 and 3, radial inner region 40 of assigned receiving component 25 comes to rest on surface 20c, through which the relative pivot between both flywheel elements 2 and 3 is delimited. In this way, corresponding power accumulator 9 may be prevented from forming a block. If a receiving component 25 stops on a surface 20c, this receiving component 25 is braced around the circumference between this surface 20c and impingement regions 14, 15 (FIG. 1), which are carried by primary flywheel mass 2.

In the embodiment shown in FIG. 7, annular region 120a of flange 120 also has a radial projection 120b which delimits two stop surfaces 120c, 120d here, each of which is assigned a receiving component 125 or 125a.

For many applications, it may also be expedient if corresponding receiving components are only provided for motor braking.

Loading of power accumulators 10, 110, 110a to form a block may be avoided if limiting stops are provided between receiving components 25, 125, 125a and correspondingly assigned impingement regions 16, 116 of flange body 20, 120. A limiting stop of this type may, for example, be formed by radial inner regions 40 of a receiving component 25. A stop surface 40a for an arm 16 of flange 20 formed by these regions 40 may be seen in FIG. 4.

In the exemplary embodiment shown in FIG. 8, power accumulator slide and/or power accumulator receiving component 225 is designed in such a way that it may receive multiple power accumulators 210, 210a which operate in series. In the exemplary embodiment shown, both power accumulators 210, 210a are formed by at least one helical compression spring. Power accumulators 210, 210a received in receiving component 225 may have an identical stiffness or even different stiffnesses, the individual power accumulators, as already described in connection with FIGS. 1 through 6, also being able to include multiple helical compression springs, so that the individual power accumulators may also have an at least two-stage spring characteristic curve.

In the exemplary embodiment shown in FIG. 8, ends 226, 226a of power accumulators 210, 210a facing toward one another are supported radially via a retaining component 252. Retaining component 252 has radially running arms 253 which engage between end regions 226, 226a and have protuberances 250 extending around the circumference, which overlap end regions 226, 226a radially on the outside here and therefore support them against the effect of centrifugal force. Arms 253 may, however, also have a corresponding lug 151 or even both lugs 150 and lugs 151 as shown in FIG. 7. Support component 252 has an annular region 254, which is pivotable in relation to the other components forming damping device 201. This annular region 254 has at least one further extension or arm 253, which is diametrically opposite illustrated arm 253 in an embodiment as shown in FIG. 8, since illustrated receiving component 225 is also assigned a diametrically opposing, corresponding component 225.

Correspondingly implemented power accumulator receiving components 225 may also be combined with receiving components 25, 125, 125a, designed as shown in FIGS. 1 through 7, to form a complete energy accumulator 7, 8, for example, as shown in FIGS. 1 and 2.

In the embodiment of a power accumulator receiving component 325 shown in FIG. 9, ends 326, 326a of power accumulators 310, 310a facing toward one another, which are also formed here by at least one helical compression spring, are supported using a wedge-shaped support shoe 353. In the exemplary embodiment shown, support shoe 353 is also supported on regions 346, which overlap power accumulators 310, 310a around the circumference, and is movable along these regions 346, which extend around the circumference. According to an embodiment variation, however, receiving component 325 may also be at least partially open to the outside radially, i.e., regions 346 are not provided, at least over the possible peripheral movement path of separator 353 in relation to receiving part 325. For a design of this type, support shoe 353 may then be supported directly on a surface corresponding to surface 131a, as shown in FIG. 7. As may be seen from FIG. 9, support shoe 353 again has corresponding protuberances, which are implemented here similarly to lugs 250 as shown in FIG. 8 and are used for radial support of power accumulator end regions 326, 326a.

Power accumulator receiving components 225, 325 may be implemented in regard to their basic construction similarly to receiving component 25, described in connection with FIGS. 3 through 5. Therefore, they may also be composed of two segmented components, these components then forming a continuous receiver extending around the circumference, in which at least two power accumulators 210, 210a and/or 310, 310a and support region 253 or support shoe 353, possibly provided between them, are received.

For power accumulator receiving component 425, partially shown in FIG. 10, which may be implemented similarly to that shown in FIG. 9, a separator or support shoe 453 may be provided between both power accumulators 410, 410a, which has the same function as support shoe 353 shown in FIG. 9. The essential difference of support shoe 453 from support shoe 353 is that it is not supported by sliding and/or rubbing on regions 446 of receiving component 425, which enclose it around the circumference, but rather it is movable along regions 446 or even, as described in connection with FIG. 9, along a corresponding surface 131a, as shown in FIG. 7, using a support bearing 454, which includes a roller 456 here. Support roller 456 may be implemented in one piece and have, viewed in the axial direction, a central region having a larger diameter on both sides of which cylindrical regions having a smaller diameter are present, which are clipped into a correspondingly implemented depression and/or recess of shoe 453. Bearing 454 may, however, also have a cylindrical bolt or pin which receives a needle bushing and is connected to separator 453, using at least one snap connection, for example. The needle bushing may then rotate on the pin or bolt and roll along regions 446 and/or along a surface 131a.

Figures 11, 13:
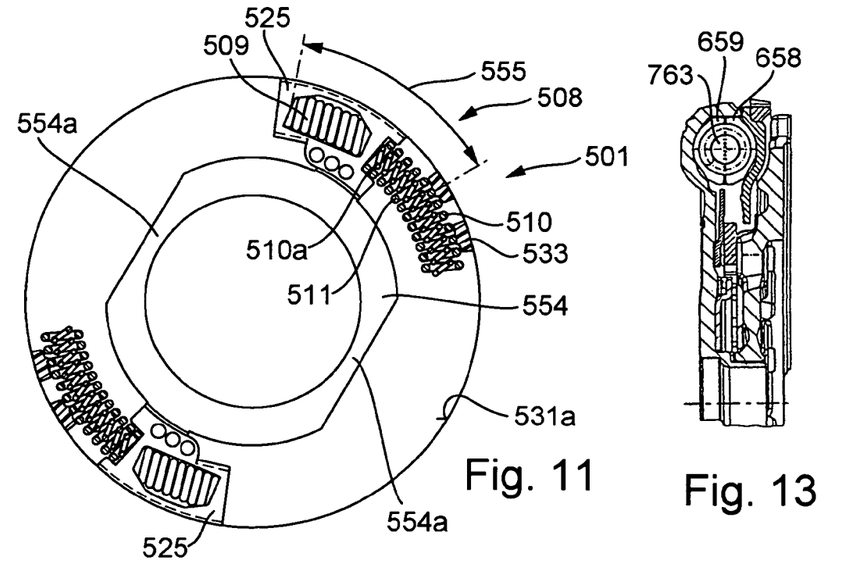
FIGS. 11 to 16 show further possible designs and/or details of damping devices.

In rotational vibration damping device 501, only partially shown in FIG. 11, power accumulator receiving components 525, which are assigned to one another and provided uniformly around the circumference of rotational vibration damping device 501, are connected to one another via a component 554, which is implemented here like a ring. Receiving components 525 are retained by component 554 against the effect of centrifugal force which acts upon them. Because of this, at least up to a specific rotational speed of the driving engine, receiving components 525 do not frictionally rest against outer guide surface 531a for power accumulators 510, which are supported here on this surface via friction shoes 533. In this way, a longitudinal region 555 of energy accumulator 508, which is formed here by power accumulator 510 and power accumulator 509, results, via which a practically frictionless compression of power accumulators 509 and 510 is made possible. As may be seen from FIG. 11, in the exemplary embodiment shown, end 510a of a power accumulator 510 is permanently coupled to assigned receiving component 525, viewed around the circumference of torsional vibration damper 501, in a form-fitting manner, for example. For this purpose, at least one end coil of helical compression spring 511 forming power accumulator 510 may be coupled via a form-fitting connection to corresponding receiving component 525.

Connection component 554, viewed in the radial direction, may practically be implemented to be stiff enough that at least approximately up to the maximum rotational speed of the driving engine, receiving components 525 do not come to rest on support surface 531a. Connection component 554 may, however, also have elastically deformable regions which ensure that if a minimum rotational speed of the driving engine is exceeded, the deformation of component 554 or of regions of component 554 allows receiving components 525 to come to rest on support surface 531a, so that if this rotational speed is exceeded and with increasing rotational speed, an increasing frictional damping may be achieved using receiving components 525. In the exemplary embodiment shown in FIG. 11, these elastically deformable components are schematically shown by regions 554a of connection component 554 which are reduced in cross-section. Such elastic regions may, however, also be formed by corresponding cutouts or notches in connection component 554. Notches of this type may, for example, form meander-shaped or accordion-shaped sections.

Components 254 and 554 described in connection with FIGS. 8 and 11 may, for example, be pivotably mounted on a flange component, such as flange component 20 shown in FIGS. 1 and 2. For this purpose, the flange may have at least one step which forms an annular receiver, on which component 254 or 554 is guided via its inner contour, at least essentially centered. A component 254 or 554 may, however, also be positioned radially using arms 253 or receiving components 525.

Figure 12:
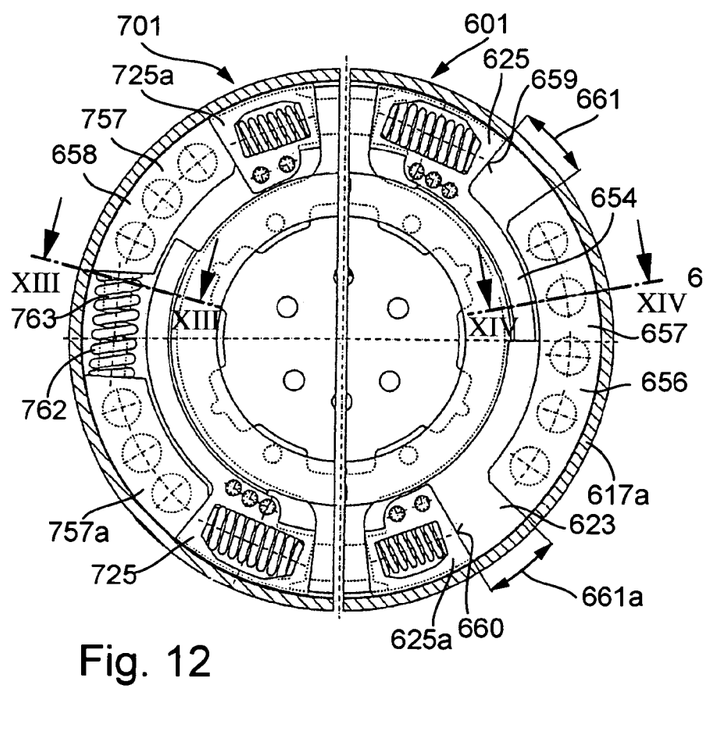

A further embodiment variation in which receiving components 625, 625a according to the present invention are used is shown in a half view in FIG. 12. It may be seen that receiving component 625 is rotationally coupled via an annular connection component 654 to a diametrically opposite receiving component similar to component 625. In a similar way, receiving component 625a is also coupled to at least one further corresponding receiving component 625a so that they rotate together. At least some of receiving components 625 and/or 625a may, however, also be movable as an independent receiving component inside regions 617a, which axially overlap them, in a similar way to that described in connection with FIGS. 1 and 2 in connection with receiving components 25 or in connection with receiving components 125, 125a. The construction shown in FIG. 12 essentially differs from the preceding embodiments in that the elongated power accumulator, formed by helical compression springs, for example, as shown by 9 in FIGS. 1 and 2, for example, is replaced by a hysteresis unit 656, which has a slipping moment here that is smaller than the nominal torque of the driving engine. The total pivot resistance moment between both flywheel mass elements, such as 2, 3 as shown in FIG. 1, produced by hysteresis unit 656, only a part of which is shown, may be on the order of magnitude of 10 to 70% of the nominal torque of the corresponding assigned engine. For many applications, however, this pivot resistance moment may also be designed as larger or even smaller. Therefore, hysteresis unit 656 acts similarly to a slip clutch, which only has a limited torque transmission capacity in relation to the nominal torque of the driving engine, however.

Figure 14:
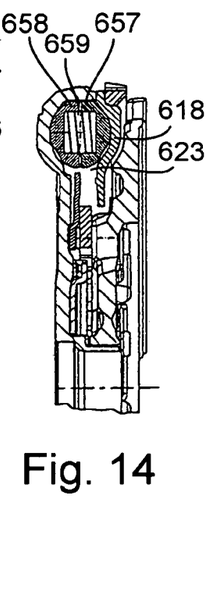

In the exemplary embodiment shown, hysteresis unit 656 is formed by segmented friction shoes 657, 658, which are shown in section in FIG. 14. These friction shoes 657, 658 are received in the ring-like receiver 623 delimited by the components of flywheel mass elements 602 and are braced against the inner walls of components 617, 618, which delimit ring-like receiver 623, using energy accumulators, formed here by helical compression springs 659. As may be seen from FIG. 12, in the exemplary embodiment shown, friction segments 657, 658 are dimensioned around the circumference in such a way that there is a pivot angle play 661, 661 a between them and support or impingement regions 659, 660 of receiving components 625, 625a. In FIG. 12, segments 657, 658 are shown in a central angular position in relation to receiving components 625, 625a. However, during the operation of torsional vibration damper 601, friction segments 657, 658 may assume any arbitrary position between receiving components 625, 625a. This position is a function of the magnitude of the torsional vibrations arising.

A hysteresis unit, which is formed by two hysteresis subunits 757, 757a, is again provided in the embodiment shown in FIG. 12a. The basic construction and the basic positioning of hysteresis subunits 757, 757a are comparable to hysteresis device 657 described above. Hysteresis subunits 757, 757a differ in their function, however, from hysteresis unit 657 in that in the exemplary embodiment shown in FIG. 12a, friction segments 658, 659 forming the hysteresis subunits, which are also recognizable in FIG. 13, rest directly against receiving components 725, 725a. An energy accumulator in the form of a helical compression spring 762 is provided between hysteresis subunits 757, 757a, which are positioned one behind the other around the circumference. Hysteresis subunits 757, 757a may apply at least approximately equal frictional moment. For many applications, however, it may also be expedient if the two hysteresis subunits produce different frictional moments. Depending on the application, it may be expedient if energy accumulator 662 is positioned without pre-tension between both hysteresis subunits 757, 757a. However, it may also be advantageous for many applications if energy accumulator 762 is installed with pre-tension in torsional vibration damper 701. The pre-tension of energy accumulator 762 may be dimensioned in this case in such a way that the restoring moment produced by this accumulator, at least over a section of its compression path, is smaller than the pivot resistance moment produced by hysteresis unit 657 and/or by hysteresis unit 657a through friction. However, for many applications it may also be advantageous if the pre-tension of energy accumulator 762 at least essentially corresponds to the pivot resistance moment of at least one of hysteresis subunits 757, 757a or is even greater than this pivot resistance moment. To hold energy accumulator 762, friction segments 658, 659 forming hysteresis subunits 757, 757a may have protuberances in the form of lugs 763, which engage in the inner helical spring forming energy accumulator 762.

Helical compression spring 11 partially shown in FIG. 2a carries friction shoes 33a, 33b, which are positioned inside a torsional vibration damper 1 in a way similar to friction shoes 33. Reference is made to incorporated-by-reference DE 102 09 838 A1 and U.S. patent Publication Ser. No. 2002/147051, mentioned above, in regard to the use and arrangement of friction shoes 33a, 33b of this type, as well as their possible attachment to the coils of a helical compression spring 11, so that a more extensive description is not necessary in this regard in the present application.

Friction shoes 33a, 33b, which are each permanently attached to a coil of helical compression spring 11 at least around the circumference, have, viewed in the longitudinal direction of helical compression spring 11, a lug and/or a tongue-shaped projection 34, 35 extending in the longitudinal direction of helical compression spring 11 on at least one side. Lugs 34, 35 point toward one another and may overlap at least partially, viewed in the longitudinal direction of spring 11. Lugs 34, 35, which point toward one another, are shaped onto friction shoes 33a, 33b in such a way and have a contour such that they may move past one another if the spring coils between friction shoes 33a, 33b are compressed. Lugs 34, 35 cause the spring coils provided radially inside them to be supported even under the effect of centrifugal force, so that the spring regions provided between two neighboring friction shoes 33a, 33b may not deform radially outward under the effect of centrifugal force. This prevents these spring regions and/or coils from coming to rest between the outer regions of friction shoes 33a, 33b. The latter would possibly result in destruction or at least increased wear of friction shoes 33a, 33b, since the corresponding spring coils must be pressed back inward via these friction shoes.

As may be seen from FIG. 2a, in the exemplary embodiment shown, friction shoes 33a, 33b are designed in such a way that, viewed in the longitudinal direction of spring 11, they have a corresponding lug 34, 35 on both sides. Lugs 34, 35 positioned on both sides of a friction shoe 33a or 33b are positioned offset in relation to one another. Friction shoes 33a, 33b are preferably received inside the torsional vibration damper in such a way that they are secured against pivoting in relation to helical compression spring 11.

Figure 15:
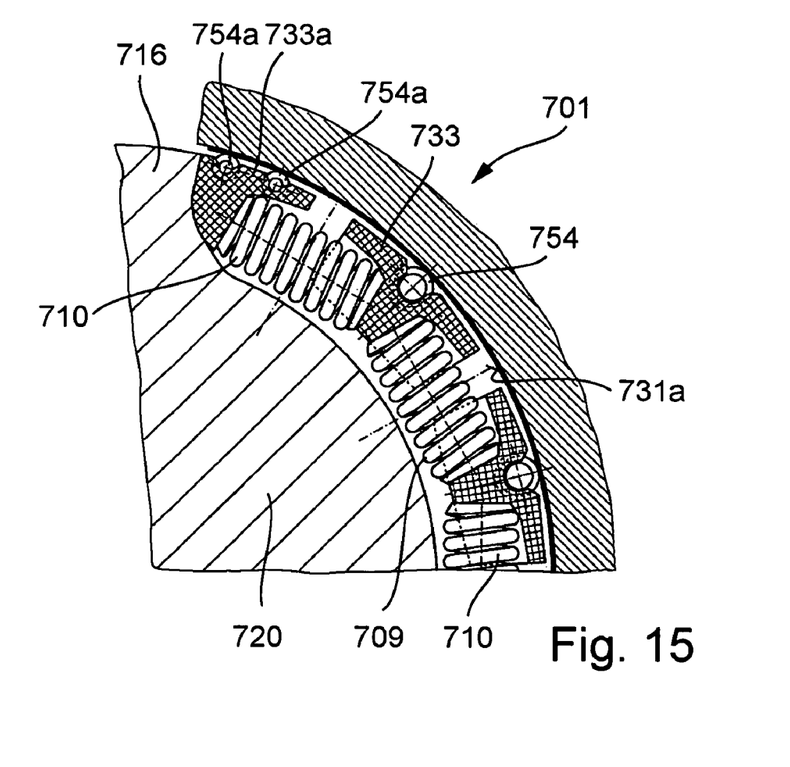

The detail of a torsional vibration damper 701 illustrated in FIG. 15 shows an energy accumulator 709, which is formed here by individual springs 710 positioned one behind another. The ends of two sequential springs 710 facing toward one another are supported radially via a roller shoe 733. In the exemplary embodiment shown, roller shoe 733 has only one roller 754, but it may also have at least two rollers of this type, which are positioned one behind another around the circumference. Via at least one roller 754, roller shoe 733 is supported on a roller surface 731a extending around the circumference. Roller shoe 733a is also supported on this roller surface 731a, also with rollers 754a interposed. Roller shoe 733a is provided between one end of energy accumulator 709 and the regions which support and/or impinge this end, of which a support region 716 of a flange 720 is shown here.

The use of two rollers 754a positioned one behind another around the circumference allows perfect support of roller shoe 733a. In particular, tipping of this roller shoe 733a may be avoided through a design of this type.

Figure 16:
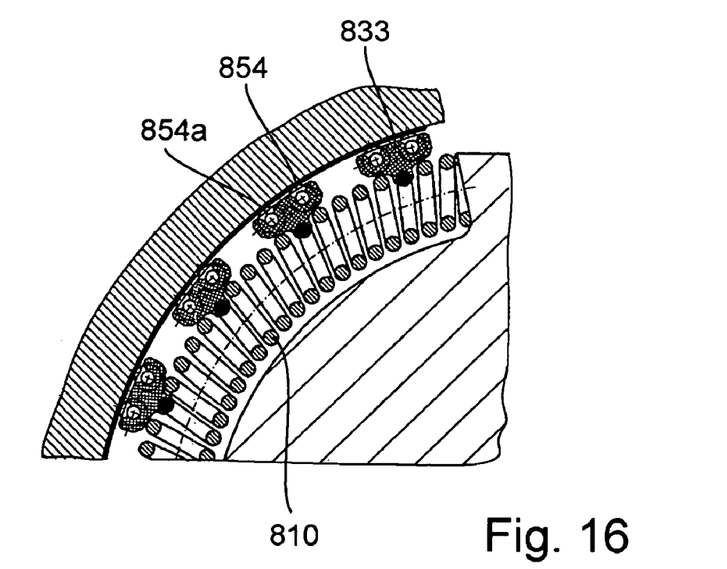

Roller shoes 833 shown in FIG. 16 are received on individual coils of a helical compression spring 810 in a similar way to that described in connection with friction shoes 33, 33a, and 33b. Roller shoes 833 each include two rollers 854, 854a, positioned one behind another around the circumference, which are implemented in a similar way to that described in connection with rollers 454 shown in FIG. 10 and may be connected to the actual shoe body. The system of rollers 854, 854a shown in FIG. 16 may be used in principle in support bodies, for example, 733 shown in FIG. 15 or 453 shown in FIG. 10.

What is claimed is:

1. A torsional vibration damper comprising:
    a first part and a second part rotatable around an axis of rotation, the first part being pivotable with respect to the second part;
    at least one energy accumulator compressible through pivoting of the first part with respect to the second part, the energy accumulator acting around a circumference of the torsional vibration damper, the energy accumulator having at least one spring having end regions and an intermediate region between the end regions; and
    a carrier for receiving the spring, the carrier having a carrier region radially overlapping the intermediate region outside of the intermediate region, the carrier being pivotable with respect to the first and second parts, the end regions of the spring being supported in the carrier so that the intermediate region remains contactless, at least up to a limiting rotational speed, in relation to the carrier region.

2. The torsional vibration damper as recited in claim 1 wherein the at least one spring includes at least two compression springs positioned one behind another in series, the two compression springs being received in the carrier, facing end regions of the springs located circumferentially in series being supported via at least one support element.

3. The torsional vibration damper as recited in claim 1 further comprising a further spring positioned outside the carrier, the at least one spring received in the carrier being operatively connected in series to the further spring positioned outside the carrier, the further spring being compressible using support regions provided on the carrier.

4. The torsional vibration damper as recited in claim 3 wherein the further spring is supportable directly on the carrier.

5. The torsional vibration damper as recited in claim 3 wherein an end of the further spring facing toward the carrier is connected to the carrier.

6. The torsional vibration damper as recited in claim 3 wherein the further spring has an elongated shape and is formed by at least one helical spring.

7. The torsional vibration damper as recited in claim 3 wherein the further spring is supportable radially on the outside via at least one support element, the support element being positioned between the further spring and a ring shaped wall region overlapping the further spring axially, the support element being movable along the wall region when the further spring is compressed.

8. The torsional vibration damper as recited in claim 7 wherein the at least one support element includes a plurality of support elements spaced apart from one another over a length of the further spring.

9. The torsional vibration damper as recited in claim 1 wherein the first part and second part are dual-mass flywheel parts, the first part having an annular receiver for the carrier, the carrier being at least limitedly pivotable inside the annular receiver.

10. The torsional vibration damper as recited in claim 9 wherein the annular receiver is delimited by at least one ring shaped wall region overlapping the at least one carrier radially on the outside of the carrier region.

11. The torsional vibration damper as recited in claim 10 wherein the carrier is radially supported on the ring shaped wall region and is movable along the wall region at least under the effect of centrifugal force.

12. The torsional vibration damper as recited in claim 9 wherein the annular receiver has support regions for supporting the carrier at least in a relative pivot direction between the first and second parts.

13. The torsional vibration damper as recited in claim 9 wherein the second part has impingement regions projecting into the annular receiver for contacting the at least one spring received in the carrier.

14. The torsional vibration damper as recited in claim 1 wherein the carrier has free regions extending around the circumference, impingement regions for the at least one spring received in the carrier capable of entering the free regions during a relative rotation of the first and second parts.

15. The torsional vibration damper as recited in claim 1 further comprising a second carrier connected to the carrier, the carrier and the second carrier being supported against centrifugal force by at least one ring shaped component.

16. The torsional vibration damper as recited in claim 15 wherein the carrier and second carrier are diametrically opposed.

* * * * *